United States Patent [19]

Foster

[11] 4,261,449
[45] Apr. 14, 1981

[54] BICYCLE PEDAL ACTUATED BRAKE CONTROL AND RELEASE SYSTEM

[76] Inventor: Edwin E. Foster, 1801 Camp Craft Rd., Austin, Tex. 78746

[21] Appl. No.: 937,465

[22] Filed: Aug. 28, 1978

[51] Int. Cl.³ .......................... B62L 5/00; B62L 5/18
[52] U.S. Cl. .......................... 192/5; 64/DIG. 2; 74/594.2; 188/24
[58] Field of Search .............. 192/5, 6 B; 188/24; 74/594.2; 64/DIG. 2

[56] References Cited

U.S. PATENT DOCUMENTS

| | | | |
|---|---|---|---|
| 567,949 | 9/1896 | Bergue | 192/6 B |
| 600,045 | 3/1898 | Robison | 192/6 B |
| 616,075 | 12/1898 | Caldwell | 192/6 B |
| 631,011 | 8/1899 | Hendricks | 192/6 B |
| 658,269 | 9/1900 | Lloyd | 192/5 |
| 1,636,262 | 7/1927 | Troendly | 64/DIG. 2 |
| 2,186,816 | 1/1940 | Bernier | 192/5 |
| 3,888,334 | 6/1975 | Mack | 188/24 |
| 4,030,774 | 6/1977 | Foster | 188/24 X |

FOREIGN PATENT DOCUMENTS 231853  4/1944  Switzerland .......................... 192/5

*Primary Examiner*—Allan D. Herrmann
*Attorney, Agent, or Firm*—Kalish & Gilster

[57] ABSTRACT

A bicycle having front and rear wheel caliper brakes connected by cables to a plate member rockably mounted on a support rearwardly of the crankshaft; there being a latch arm engaged to said plate and having a cam follower portion for engaging a cam formed on the edge of a disc cam keyed on said crankshaft for mutual interengagement upon back pedaling action whereby said latch arm is translated rearwardly with consequent rocking of said plate member to apply a rearward pulling upon said cables for braking of the bicycle. A drive sprocket is carried upon the opposed end of said crankshaft for limited relative movement with respect thereto, there being an arcuate aperture in said drive sprocket receiving a pin from the adjacent pedal crank, which pin is relatively movable within said aperture so that after braking action said crankshaft may be rotated a predetermined distance prior to engagement of the finger with the forward end of the aperture for consequent concurrent rotation, said predetermined distance being adequate for disengaging said latch arm for brake releasing action. The brake release aspect of this invention may also be used with bicycles having front free wheel systems wherein an arrangement of intermeshing teeth are provided on the drive sprocket and a sleeve to allow for requisite relative movement.

14 Claims, 10 Drawing Figures

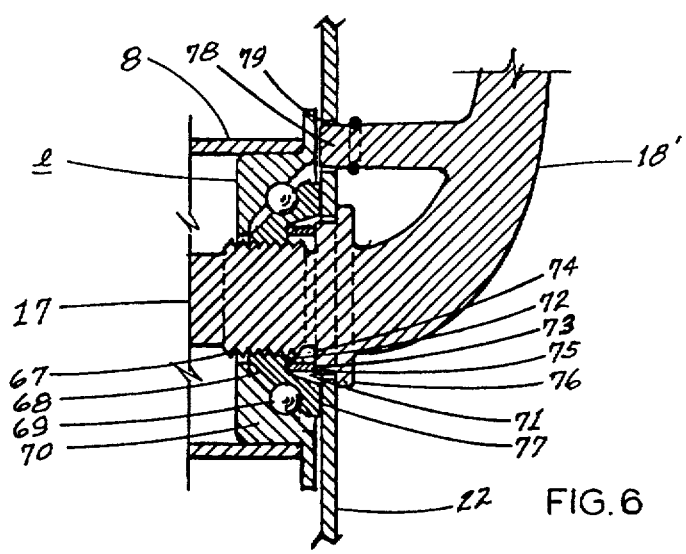
FIG. 6
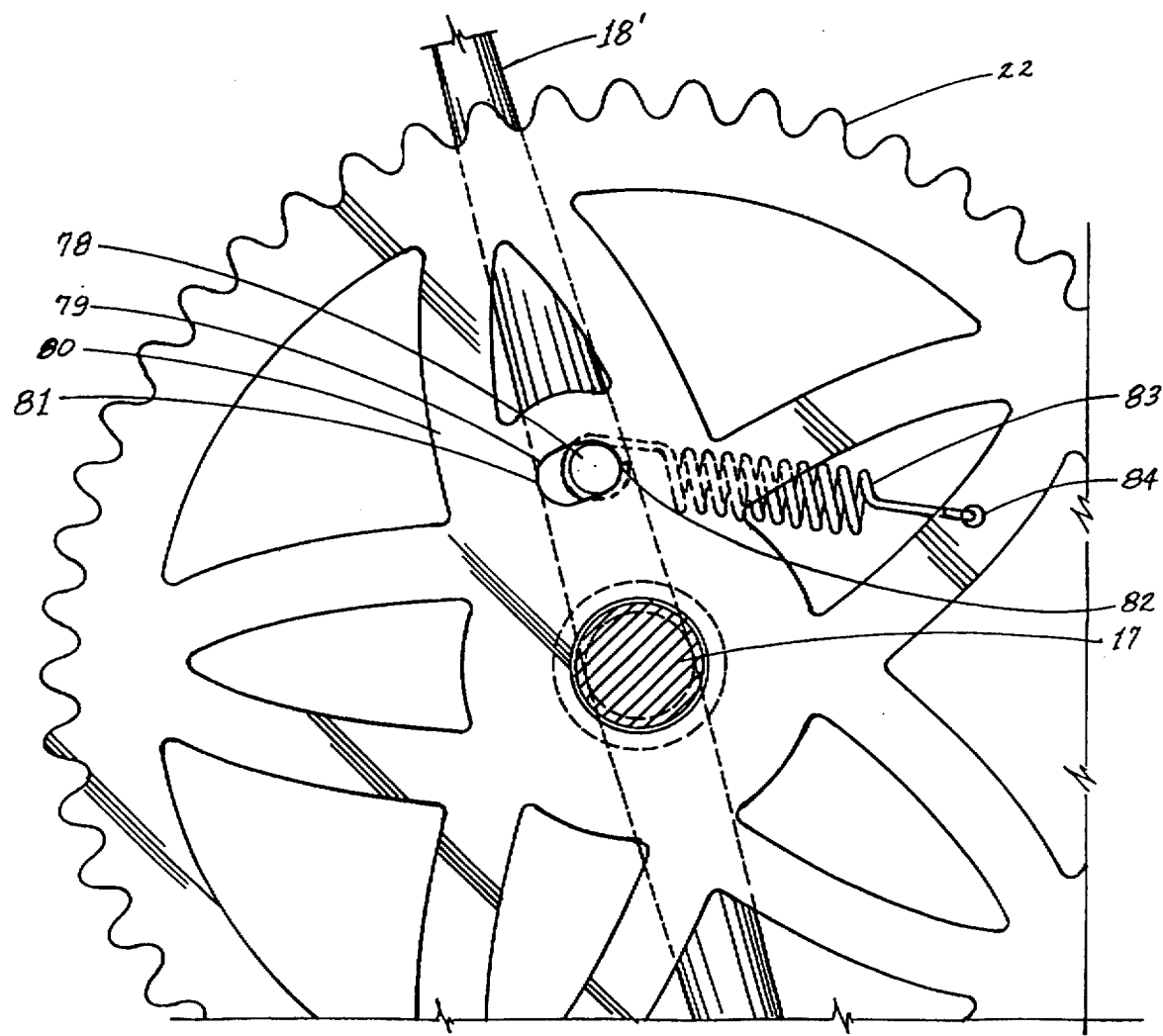

BICYCLE PEDAL ACTUATED BRAKE CONTROL AND RELEASE SYSTEM

BACKGROUND AND SUMMARY OF THE INVENTION

This invention relates in general to bicycles and, more particularly, to pedal actuated braking systems therefor.

With the widespread usage of caliper brakes on bicycles there has understandably been numerous efforts made for eliminating the necessity of operating such brakes by hand controls and substituting therefor pedal actuating means. Among such efforts are the systems disclosed in U.S. Pat. Nos. 3,858,689; 3,966,299 and 4,030,774. Although such prior art discloses various cam operated linkage means for effecting braking force upon the brake control cables, the same have been relatively complex in construction and have invariably required the utilization of a manually operated releasing mechanism to return the system to unbraked condition. Thus, said systems heretofore known have not had the capability of permitting a braking action without causing a locking of the brakes. With the brakes thus in locked condition the tautness of the transmission cable inhibits any forward rotation of the pedal crankshaft until the brakes have been released.

Accordingly, it has been recognized that the problem to be resolved resides in preventing a locking of the brakes while permitting braking action so that forward travel could be promptly resumed without the intervention of some hand manipulation for brake release action.

In U.S. Pat. No. 3,966,229 there are shown various expedients designed to create a slackness in the transmission cable during braking action for the purpose of allowing the crankshaft to turn for resuming forward travel from braked condition. If the crankshaft can turn forwardly and not be restrained by a taut chain, brake releasing could be brought about without independent operation. However, although effective, the structures set forth in said last-mentioned patent are indeed relatively complex and expensive to produce and install.

Therefore, it is an object of the present invention to provide a brake control and release system for bicycles wherein despite chain tautness being brought about through braking action the crankshaft may turn in advance of rotation of the drive sprocket for resuming forward travel with concurrent brake release.

It is another object of the present invention to provide a pedal actuated brake assembly for bicycles which incorporates a minimum number of components which are of durable sturdy construction so that malfunctioning is substantially eliminated.

It is another object of the present invention to provide a pedal actuated brake control assembly for bicycles which permits of braking action without causing the bicycle wheels to become in a fully locked state thereby according the operator a sensation of braking comparable to that of automobile power brakes.

It is a further object of the present invention to provide a pedal actuated brake control assembly for bicycles which, at the option of the operator, may produce a wheel locking condition for parking purposes and with means for readily effecting release from such state.

It is a still further object of the present invention to provide a pedal actuated brake control and release assembly for bicycles which is adapted for incorporation upon existing bicycles whether single speed, three-speed or ten-speed and including bicycles which are provided with front free wheel systems, such as identified by the name "Shimano"; with the installation of the present invention being achieved with facility and without modification of the bicycle basic structure.

It is another object of the present invention to provide a brake control and release assembly which although being more readily adapted for use with a unitary crankshaft for pedal crank arrangement may also be used with multi-part pedal crank assemblies.

BRIEF DESCRIPTION OF THE DRAWINGS

FIG. 6 is a transverse view, in partial section, taken on the line 6—6 of FIG. 3.

FIG. 7 is a side view taken on the line 7—7 of FIG. 3.

DESCRIPTION OF THE PREFERRED EMBODIMENT

Figure 1:
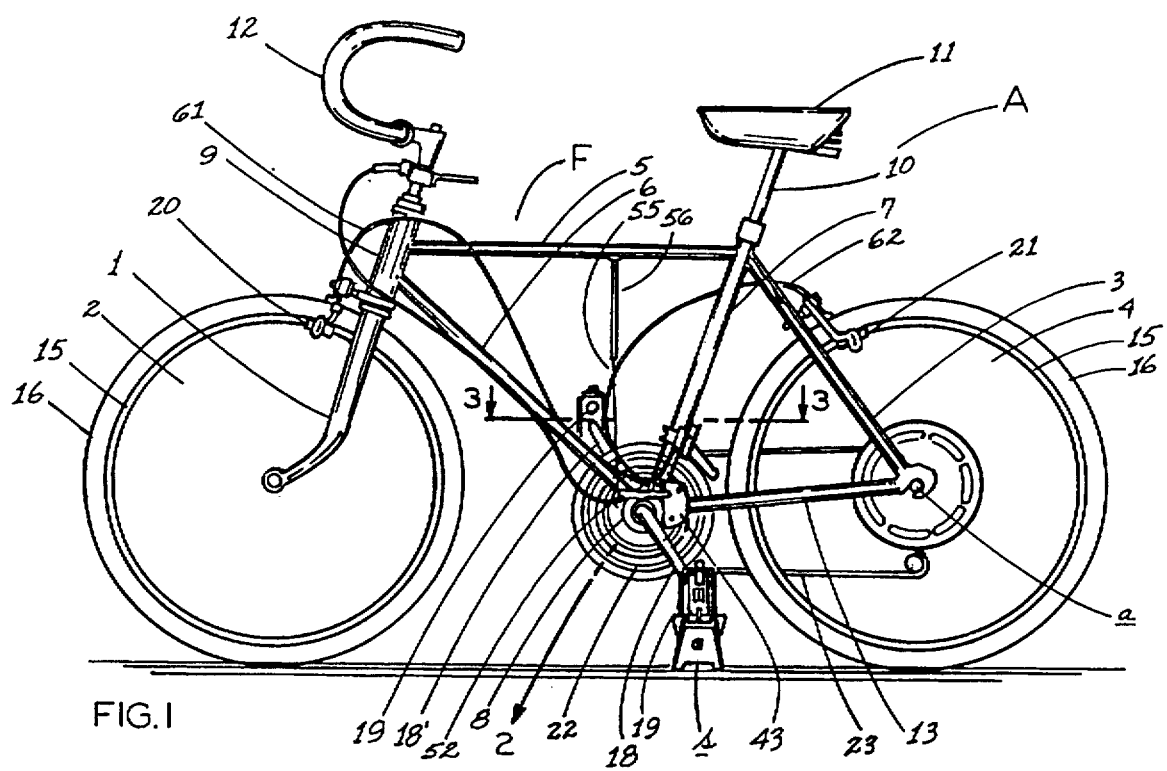
FIG. 1 is a side view of a bicycle having mounted thereon a pedal actuated brake constructed in accordance with and embodying the present invention.

Referring now by reference numerals to the drawings which illustrate the preferred embodiment of the present invention, A generally designates a bicycle including a frame F having a front fork 1 mounting a front wheel 2, a rear fork 3 mounting a rear wheel 4, with there being a cross bar 5 connecting said forks 1,3. Frame F also incorporates front and rear diagonal bars 6,7, respectively, which at their lower ends merge into the usual hub 8. At its forward upper end front diagonal bar 6 is integral with the upper portion of post 9 of front fork 1, while the upper end of rear diagonal bar 7 is unitary with the upper end fork 3 and the rearward end of cross bar 5; there being the customary rod 10 being extensibly accommodated in rear diagonal bar 7 for supporting the usual seat 11. Mounted upon post 9 are handle bars 12. Diverging rearwardly from hub 8 are the usual support bars 13,14 for the rear axle a. Each wheel 2,4 is of the spoke-type, embodying the customary rim 15 for receiving a tire 16.

Hub 8 supports a shaft 17 of a pedal crank assembly p, which in most American made bicycles is of one piece construction, with the shaft 17 carrying at each end thereof the usual pedal crank 18,18' which, at their respective ends, each carry a foot pedal 19. As shown in FIG. 1 foot pedals 19 have engaged thereon bicycle support stands s which may be of the type shown in U.S. Pat. Nos. 3,857,585; 3,877,726 and 4,030,774, the eration of which coordinates with the braking action, more fully developed in the aforesaid patents.

Bicycle A is provided with caliper brakes 20,21 upon ont and rear wheels 2,4, respectively.

Although the braking system of the present invention useful upon bicycles of various types, such as single eed, three-speed, and ten-speed; Bicycle A, for purises of simplicity of exposition, is shown herein as ibodying a single front chain wheel or drive sprocket mounted upon hub 8 in a manner to be described low and having engaged thereabout the forward end irtion of the usual endless transmission or drive chain which is engageable in its rearward end portion out a driven sprocket (not shown) or a predetermined iven sprocket of a cluster, customarily five, of driven rockets, or so-called derailleur gears, mounted upon ar axle a in side-by-side relationship on ten-speed cycles.

Figure 4:
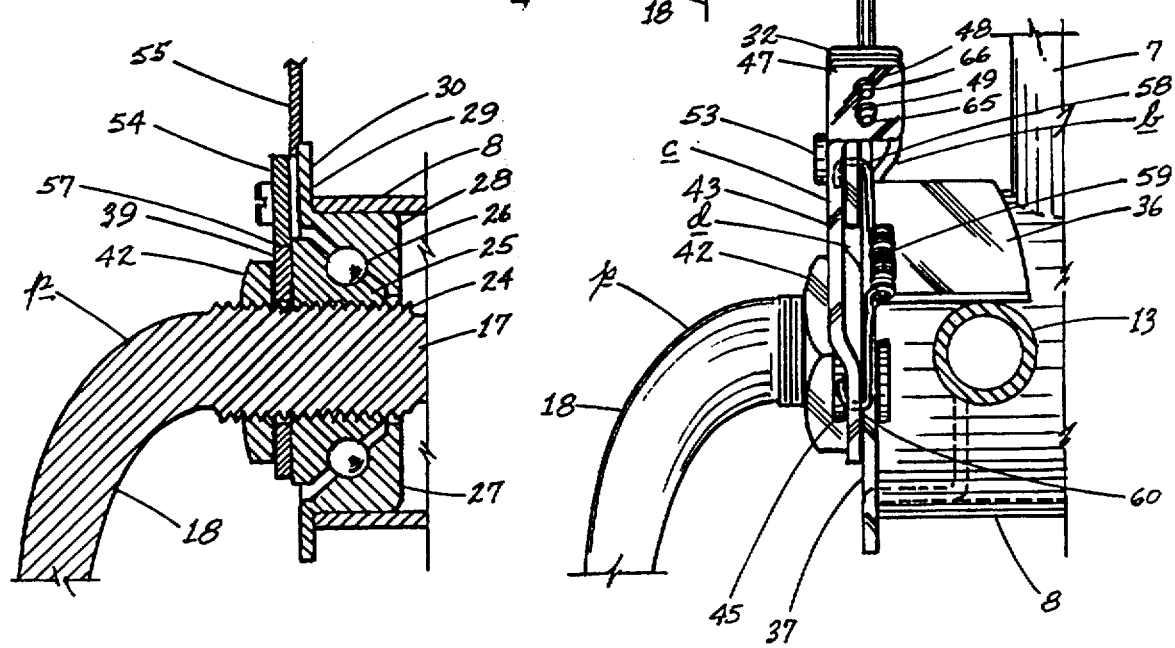
FIG. 4 is a vertical transverse sectional view taken on the line 4—4 of FIG. 3.
Figure 5:
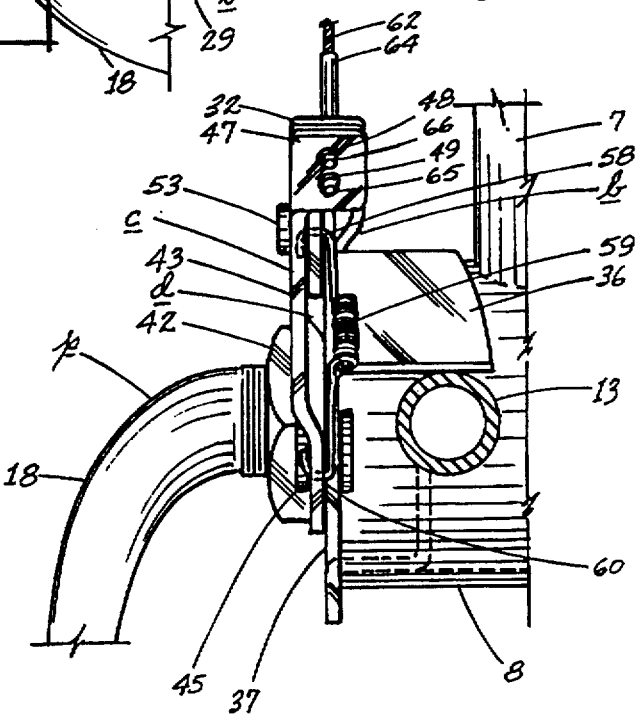
FIG. 5 is a fragmentary rear elevational view, in partial section, taken on the line 5—5 of FIG. 3.

Referring now particularly to FIG. 4, it will be seen at shaft 17 immediately proximate crank 18 is exterilly threaded, as at 24, for threadedly engaging the ner race 25 which is of general conical form of a ball :aring assembly 26 incorporating as an outer race 27 ie inner cooperating portion of a cup 28 of a stationary :acket 29 of a braking assembly, indicated generally B; ill bearing assembly 26 being thus of well-known conruction does not form a part of the present invention. up 28 is pressed, as in the usual fashion, within the ljacent end of hub 8 which constitutes a crank housig. Bracket 29 integrally embodies a peripheral flange 0 extending circumferentially about the normally open nd of cup 28 which flange in its rearward portion (see IG. 2) is extended to provide an upper boss 31 which inwardly offset from the major plane of flange 30, as t b (FIG. 5). Said boss 31 is provided with laterally ut-turned flange 32 provided with a pair of vertically ligned upper and lower apertures 33,34 for purposes resently appearing. Downwardly of boss 31, bracket 9 in its rearward edge is downwardly and rearwardly iclined, as at 35, with there being an inwardly turned etent or foot 36 extending immediately above bicycle rame support bar 13 and abutting the upper edge of the atter in the lower end portion of said detent 36 for nhibiting rotation of bracket 29 about shaft 17. Downvardly of marginal portion 35, bracket 29 embodies a oss 37 having an aperture 38 for purposes presently ppearing. It will thus be seen that bracket 29 is of eneral plate character but incorporating a stamped cup ind oppositely extending flange 32 and detent 36. Keyed upon shaft 17, immediately outwardly of bearing !6, is a disc cam 39 incorporating a pair of working edge ortions 40,41 which are 180° apart. Serving to prevent intoward displacement of cam 39 is a retention nut 42 hreadedly secured upon shaft 17 (FIG. 4).

Provided for swingable movement with respect to bracket 29 is a pivot plate 43 having an opening 44 in its ower portion for alignment with aperture 38 of bracket 29 for extension therethrough of a rock pin 45. Above opening 44 the pivot plate 43 is outwardly offset, as at c, for cooperating with the offset b of bracket 29 to provide an intervening clearance or spacing d for purposes presently appearing. In its upper forward portion, pivot plate 43 is contoured to present a forwardly opening recess 46 which extends slightly downwardly and rearwardly, as at 46'. Above recess 46 plate 43 is formed to provide an offset ear 47 extending laterally outwardly and in substantial registration with flange 32 of bracket 29; said ear having upper and lower openings 48,49 in alignment with upper and lower apertures 33,34 for purposes presently appearing.

In the rearward upper portion of pivot plate 43 there is provided an opening 50 for alignment with an aperture 51 formed in the rearward end portion of a latch arm 52 for receiving a pin, rivet, or other suitable fastening element 53, said latch arm 52 extending into the spacing d. Latch arm 52 is relatively elongated and proceeds forwardly from its point of attachment to pivot plate 43, upwardly of cam 39 to a point spacedly forwardly of hub 8 for engagement to a bracket 54 to which latter is engaged the lower end portion of brake release cable 55 which extends upwardly to a point for convenient manipulation by the bicycle operator, such as to a tube 56 depending from bicycle cross bar 5 or, if desired, to a bracket (not shown) mounted upon bicycle frame F at a point convenient for the operator. Latch arm 52, in its lower central portion, is contoured to define a forwardly presented, depending cam follower edge 57 adapted for engaging cam working edge portions 40,41 in a manner and for purposes to be described below. In the upper rearward edge of latch arm 52 there is formed a depression or shoulder 58 for engaging the upper end of a tension spring 59, the lower end of which is suitably fixed within an opening 60 provided in the lower rearward portion of pivot plate 43; said spring 59 thus serves to urge latch arm 52 generally downwardly for maintenance of contact with the periphery of cam 39.

Figure 2:
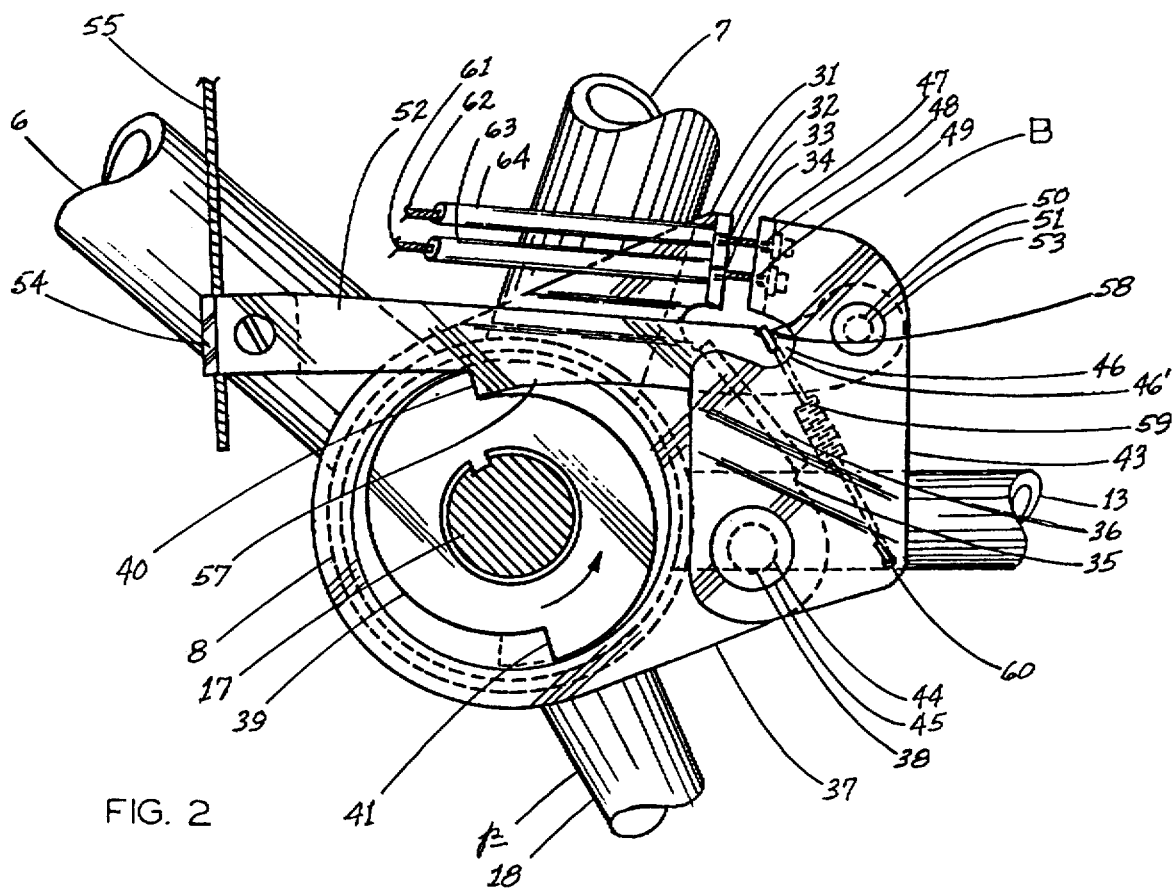
FIG. 2 is an enlarged, fragmentary side view, in partial section, taken substantially in the zone indicated at "2" in FIG. 1 illustrating the brake mechanism in braking condition.
Figure 3:
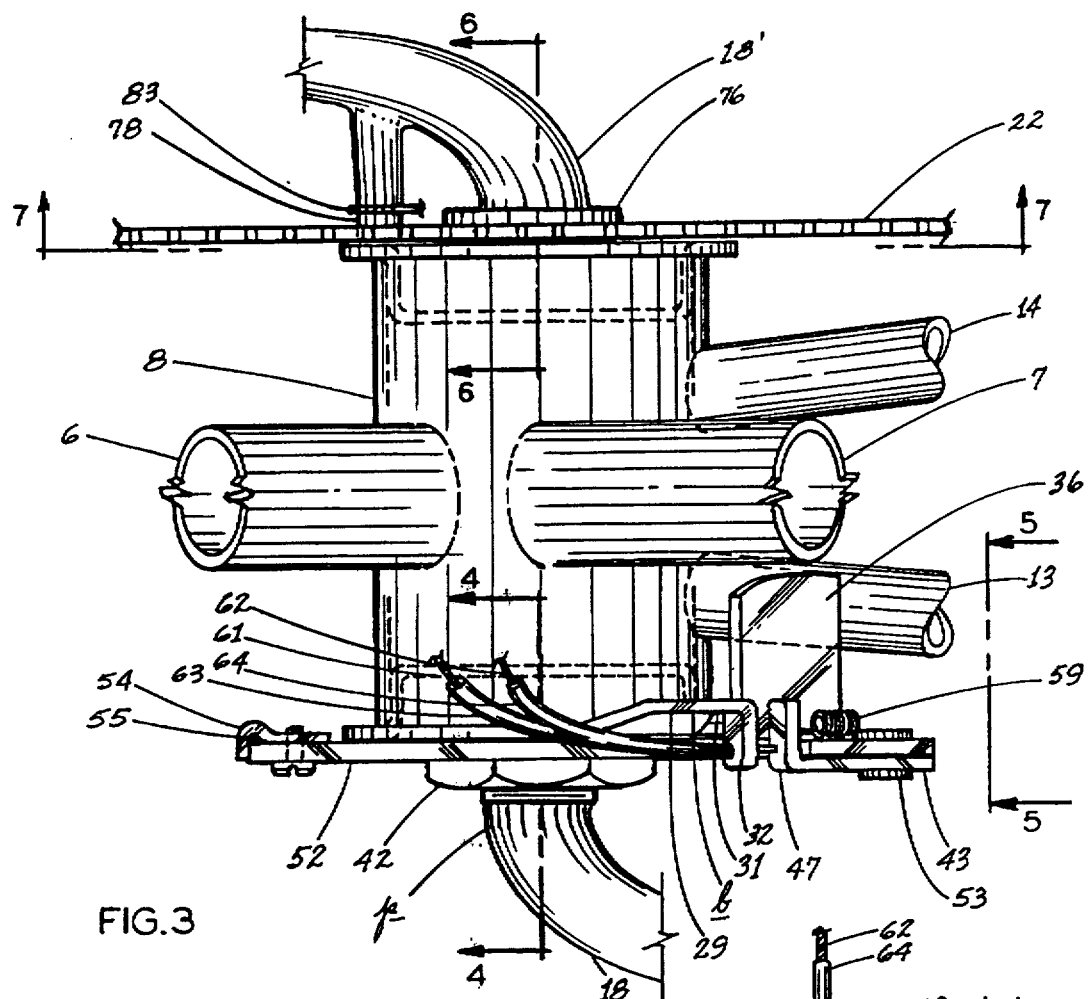
FIG. 3 is a top plan view taken on the line 3—3 of FIG. 2.

With reference to FIG. 2 it will be seen that during forward motion of bicycle A, as indicated by the arrow, cam 39 will rotate freely without impedance by latch arm 52 with the edge portion thereof extending rearwardly from cam follower 57 riding upon said cam 39.

Front and rear caliper brakes 20,21 are connected to brake assembly B by the customary brake cables 61,62, respectively, encased within the usual flexible sleeves 63,64, respectively. Cables 61,62 extend beyond the rearward ends of sleeves 63,64 with cable 61 projecting through lower aperture 34 and lower opening 49 of flange 32 and ear 47, respectively, and cable 62 extending through upper aperture 33 and upper opening 48 of said flange 32 and ear 47, respectively. The rearward projecting ends of said cables 61,62 are suitably secured against displacement as by members 65,66, respectively.

With brake assembly B in normal, operative, bicycleriding condition, wherein ear 47 will abut flatwise against flange 32; with brake release cable 55 slack; and with latch arm 52 freely riding over cam 39, bicycle A may be braked by rearward pedaling action, causing shaft 17 to rotate in a direction opposite to that indicated by the arrow in FIG. 2 with the more proximate cam working edge portion 40,41 being brought into camming relationship with cam follower edge 57 of latch arm 52. Such engagement will cause a translation of the rearward force caused by the back pedaling to be effected upon latch arm 52 whereby the same is driven rearwardly as into the position shown in FIG. 2 forcing pivot plate 43 to rock in its upper portion rearwardly about the axis developed by rock pin 45 thereby causing a pulling upon cables 61,62 by virtue of the rearward travel of offset ear 47, separating same from flange 32. Thus, by such action brakes 20,21 are placed into wheel braking condition. Spring 59 serves to maintain the engagement between the particular cam working edge portion 40 or 41, as the case may be, with cam follower edge 57 so that reliable braked condition is assured.

The foot operated brake assembly B in actuality provides the operator with a sensation similar to that of power brakes on an automobile. Except in an emergency, the operator will withdraw force on the brake assembly, or let up as it were, just before coming to a complete stop so that the wheels are still turning. Thus, despite the application of the brakes in the condition just described, the operator may immediately thereupon resume forward travel without hindrance as crank 17 may be rotated forwardly (in a direction as that indicated by the arrow in FIG. 2) and thus remove the engaged cam 40 or 41, as the case may be, from follower 56 thereby releasing the rearward pressure upon latch arm 52 which, in turn, permits pivot plate 43 to be rocked forwardly with the removal of the applied force upon brake cables 61,62 so that the associated brakes 20,21, respectively, may return to open or unbraked condition, with ear 47 and flange 32 in surface abutting relationship.

If the operator desires to park bicycle A with the wheels 2,4 thereof in locked condition, brake assembly B may be braked as above described so that wheels 2,4 may still turn; that is, wherein maximum forceful engagement between cams 40,41, as the case may be, and cam follower 57 has not been attained. The operator dismounts and then rolls bicycle A rearwardly which movement will cause crank 17 to rotate in a rearward direction (opposite so that shown by the arrow in FIG. 2) and bring about full forceful engagement between the cams 40 or 41 and cam follower 57 so that a fully wheel-locked state is brought about. When the rider desires to resume operation, it will be necessary to lift upwardly on release cable 55 to remove latch arm 52 from engaged position with the particular cam 40 or 41 and thereby free bicycle A for travel. Release cable 55 is utilized only when the wheels have been locked prior to parking. It is understood that in the event bicycle A were rolled rearwardly in a free fashion, cable 55 would have to be held in upper position to prevent engagement of latch arm 52 with disc cam 39 until wheel-locking was desired. It should be understood that the upper course of drive chain 23 becomes taut upon application of the brake assembly B when the wheels are locked and will remain in such state through the associated derailleur system so that only through release of cable 55 is crank 17 then freed for forward rotation.

Brake assembly B may be thus easily provided upon existing bicycles with minimum difficulty and expense and with the same being especially suitable for American made bicycles wherein the shaft and pedal cranks are of unitary construction. The components of said assembly B are few in number and may be most economically produced as by stamping and with cup portion 28 being of simple, stamped form and insertable within hub 8.

Accordingly, it will be seen that brake assembly B is uniquely comprised of a marked paucity of components which are most simple in construction; which may be produced most economically; and which coact in a fully reliable manner.

Efforts have been made heretofore to prevent the brakes from locking in an emergency stop, as distinguished from a parking stop, by causing the development of slack in the upper course of the transmission chain as the brakes were applied. In this connection U.S. Pat. No. 3,966,299 demonstrates various arrangements for producing such chain slack. With such slack the rider could then easily resume travel from an emergency stop with the crank being allowed to unbrake prior to the turning of the locked rear wheel because of the capacity of the drive sprocket to apply a forward pulling on the chain by reason of its limited slackness.

Bicycle A of the present invention is uniquely equipped with a means, now to be described, which will allow limited rotation of the crank shaft 17 after braking action so that the rider may resume travel without the necessity of taking positive steps to disengage latch arm 52 from cam 39. Attention is now directed to FIGS. 6 and 7. The crankshaft 17 in its end portion remote from pedal crank 18 is externally threaded as at 67, for engaging the internal threads of an inner conically shaped race 68, of conventional design, of a ball bearing 69 incorporating an outer race 70 formed in the usual manner within a stamped cup e which is press-fitted within the proximate end opening of hub 8. As will be seen inner race 68 is provided within the outward opening recess 71 thereof with an annular central shoulder 72 for abutment against the outer end edge of a circular spacer sleeve 73 surrounding the adjacent portion of shaft 17 and with the outer edge of said sleeve 73 snug against a circumferential shoulder 74 developed by a diametrally increased portion 75 of said shaft 17 which constitutes a hub for drive sprocket or front chain wheel 22. Immediately adjacent and outwardly of portion 75, shaft 17 is formed to present an enlarged flange 76 of greater diameter than portion 75 so as to be presented against the confronting portion of drive sprocket 22 for preventing displacement of the same axially inwardly of shaft 17. Said drive sprocket 22 is restrained on its opposite face against inadvertent shifting axially outwardly of shaft 17 by virtue of the base 77 of ball bearing inner race 68. Thus, by the structure described, drive sprocket 22 is maintained in proper operating position.

Integrally formed with pedal crank 18' and extending outwardly from the lower outer portion thereof, proximate the zone of merger with shaft 17 and substantially axially parallel therewith is a finger 78 for projection into a slot-like aperture 79 formed in the internal support structure 80 of drive sprocket or front chain wheel 22. With reference to FIG. 7 it will be seen that aperture 79 is radially spaced inwardly from the outer operating teeth-forming edge of drive sprocket 22 as well as being radially spaced from the hub 75 of said sprocket 22.

Figure 9:
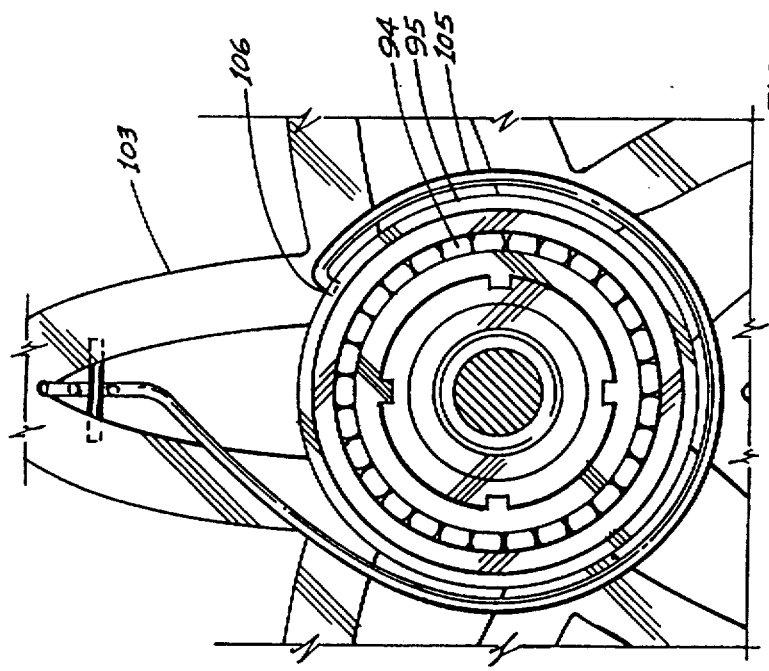
FIG. 9 is a vertical view, in partial section, taken on the line 9—9 of FIG. 8.

Said aperture 79 is of greater length then the cross-section of finger 78 so as to permit relative movement there-between for purposes now to be described. However, said aperture 79 is on an arc having the same number of degrees as that arc through which cams 40 or 41 and cam follower 57 travel in engaged condition for causing application of brakes 20,21, as above described. Finger 78 is normally urged toward the rearward or trailing end 82 of aperture 79 by a tension spring 83, the rearward end of which latter is engaged, as at 84, to the support structure of front chain wheel 22 and with the forward end being disposed about finger 78 (see FIGS. 6 and 7). During forward travel of bicycle A, finger 78 through action of crank 17 will be pulled forwardly into abutment against the forward or leading end 81 of aperture 79 with stress being thus developed in spring 83. However, when back pedaling is effected for braking action finger 78 will thus be moved toward the rearward or trailing end of aperture 79 with spring 83 thus losing its stress. Since cam 39 is keyed directly to crankshaft 17 the pressure exerted by finger 78 against the rearward end 82 of said aperture 79 will substantially correspond to the rearward pressure acting on latch 52 through engagement of cams 40 or 41 with cam
)wer 57.
'hen it is desired to resume travel after braking
)n, the operator in forwardly rotating pedal crank
will pull finger 78 toward the forward end 81 of
ture 79 with concurrent stressing of the spring 83,
such action will have permitted crankshaft 17 to
: moved through the arc permitted by aperture 79
reby the engaged cam 40 or 41, as the case may be,
:moved from engagement with cam follower 57
ciently to release latch arm 52 from rearwardly
slated position thereby releasing the bicycle brakes
hat forward travel can be continued.
is to be particularly noted that aperture 79 thus
nits crankshaft 17 to move despite the fact that the
er cource of transmission chain 23 is taut because of
:ing. In the absence of aperture 79 and associated
er 78, crankshaft 17 would not be permitted to move
tive to drive sprocket 22 as the same is held by the
transmission chain. Thus, the incorporation of this
er-aperture arrangement allows crankshaft 17 to
)ck the braking condition regardless of how hard the
rator may have applied the brakes, as in an emer-
cy, and without any need for use of release cable 55.
lowever, if it were desired to apply the parking
.es, the operator after dismounting would move
/cle A backwards a few inches, as it were, causing
upper cource of transmission chain 23 to pull drive
)cket or front chain wheel 22 rearwardly which
uld have the effect of causing finger 78 to move
tively forwardly within aperture 79 into the for-
·d end portion thereof. It will be seen that in this
dition the parking brakes can only be released by
ng of cable 55 since finger 78, being at the forward
of aperture 79, has caused crankshaft 17 to be de-
1 the requisite arc of travel for normal brake unlock-
condition as above described.
"he above described system for releasing the bicycle
kes may be adapted for utilization with bicycles
orporating what is currently known as a front free
eel system, such as of the "Shimano" manufacture,
erein the front chain wheel can over-run the pedal
nk as the rear friction free wheel maintains the chain
ι moving condition even when the rider discontinues
laling. Such feature makes it possible for the operator
:hift into low gear while coasting and braking with
back pedaling as a stopping point is approached. In
drawings the numeral 90 designates a crankshaft
strated as being integrally formed with pedal cranks
92 which latter are respectively of like construction
shaft 17 and cranks 18,18' above described. Crank-
ift 90 is externally threaded in each of its end por-
ns, as suggested at 93, for engaging and supporting
: usual bearings in a system of this type, being indi-
ed generally at 94 as the same do not form a part of
: present invention. Said bearings are received within
elatively thin walled casing 95 of a sleeve 96 carried
on crankshaft 90; there being integrally formed with
sing 95 a laterally outwardly projecting annular por-
n 97 the periphery of which is provided with a cir-
mferentially spaced apart series of teeth 98 with inter-
ning notches 99. Teeth 98 are receivable within
tches 100 developed between teeth 101 provided
cumferentially about the central opening 102 of drive
rocket or front chain wheel 103. Front chain wheel
3 is locked to sleeve 96 by a snap ring 104. Also inter-
gaging sleeve 96 and front chain wheel 103 is a spring
5, one end of which is engaged to said front chain wheel 103 and the opposite end within a suitable open-
ing, as at 106, formed in casing 95. With reference to
FIG. 9 it will be seen that spring 105 biases sleeve 96
rearwardly so that teeth 98 of sleeve 96 would be urged
against what might be considered the trailing or rear-
ward edge of notches 100. Thus, during forward travel
of the bicycle spring 105 would be stressed by reason of
teeth 98 abutting the normally forward or leading edge
of the engaged notch 100.

Figure 10:
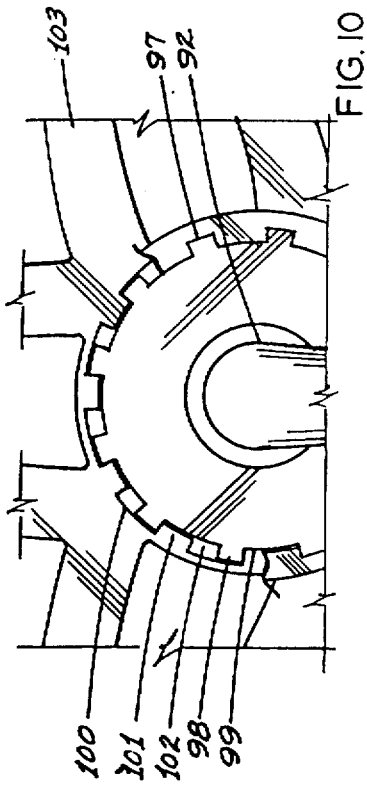
FIG. 10 is a fragmentary vertical view, partially broken away, taken on the line 10—10 of FIG. 8.
Figure 8:
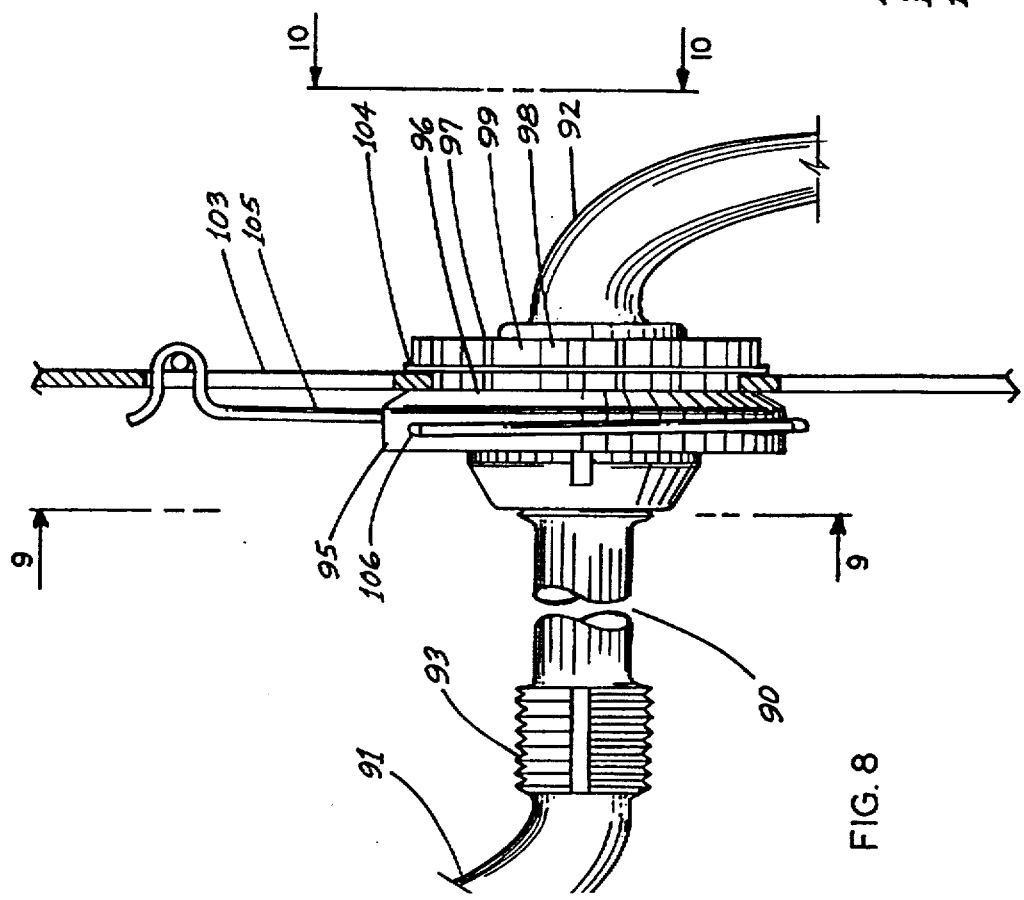
FIG. 8 is a top plan view, in partial section, of a pedal crank assembly of a front freewheel system incorporating a brake release constructed in accordance with and embodying the present invention.

With particular reference being made to FIG. 10 it is
to be observed that teeth 98 are of less circumferential
extent than the related notches 100 whereby such differ-
ential permits of relative movement between said sleeve
96 and front chain wheel 103. In the present invention
the number of teeth 98 and 101 are fewer in number
than found in the current construction of front free
wheel systems wherein there is customarily a relatively
close meshing relationship. By reducing the number of
teeth the intervening notches 99,100, as the case may be,
are perforce increased in extent thereby providing ade-
quate spacing for the indicated relative movement.

It will thus be seen that upon back pedaling teeth 98
will be at the rearward ends of their receiving notches
100 and be in such state during braking or fully braked
condition. Upon resumption of forward travel crank 90
may rotate through an arc commensurate with the path
of travel of teeth 98 in the associated notches 100 inde-
pendently of any movement of front chain wheel 103 so
that the brake assembly B, as above described, if pro-
vided upon said bicycle may be released and forward
travel resumed.

Having described my invention, what I claim and
desire to obtain by Letters Patent is:

1. For use with a bicycle having a frame with a hub-
forming casing, front and rear wheels supported on said
frame, a pedal crank assembly having a crankshaft ex-
tending through said hub-forming casing and pedal
cranks projecting from each end of the crankshaft, and
front and rear wheel caliper brakes, a brake control
assembly comprising a disc cam carried on said crank-
shaft and having at least one cam working surface, rigid
support means provided on said bicycle rearwardly of
said cam, a plate member swingably mounted in its
lower portion upon said support means, there being
brake control cables extending from said front and rear
caliper brakes, brake cable guide means provided on
said support means rearwardly of said crankshaft, said
guide means extending forwardly from said support
means spacedly above said crankshaft, means provided
on said plate member upwardly of its pivotal mounting
and rearwardly of said guide means engaging the brake-
remote ends of said brake cables passing through the
respective guide means, a latch arm extending substan-
tially longitudinally of said bicycle above said crank-
shaft and being engaged in its rearward portion to the
upper rearward portion of said plate member, a cam
follower formed on said latch arm in its lower portion
for engagement with said cam working surface upon
back pedaling action of said crankshaft whereby said
latch arm is urged rearwardly to effect rocking of said
plate member causing rearward pulling upon said brake
cables for bicycle braking action.

2. For use with a bicycle, a brake control assembly as
defined in claim 1 and further characterized by said
latch arm in its lower edge portion rearwardly of said
cam follower being nonobstructingly rideable upon the
periphery of said disc cam when said bicycle is in forward travelling state, and means urging said latch arm downwardly toward said cam.

3. For use with a bicycle, a brake control assembly as defined in claim 2 and further characterized by said latch arm urging means being a tension spring engaged at its upper end upon said latch arm in its rearward portion and at its lower end to said plate member rearwardly of the engagement of the latter with said support means.

4. For use with a bicycle, a brake control assembly as defined in claim 1 and further characterized by a brake release cable depending from said bicycle frame, and means engaging said brake release cable to the forward end portion of said latch arm forwardly of said crankshaft whereby upon lifting of said release cable said latch arm will be removed from the path of travel of said disc cam for discontinuing engagement between said cam and said cam follower in the event of bicycle braking action.

5. For use with a bicycle, a brake control assembly as defined in claim 1 and further characterized by said support means unitarily comprising a cup-shaped portion for reception within the adjacent end of the hug-forming casing, said cup having a peripheral flange projecting beyond the end of said hub-forming casing in substantially planar perpendicular relationship to said casing, said flange in its rearward portion being enlarged and contoured to provide a boss in its upper end portion with an out-turned ear, said ear being engaged on the forward surface thereof to said brake cable guide means and having an aperture for extension therethrough of the respective brake cable, said plate member having an offset ear spacedly rearwardly of, and in registering relationship with, said support means out-turned ear, and said means engaging the brake remote ends of said brake cables being provided on said offset ear, the enlarged portion of said flange including a lower rearward portion, said plate member being engaged to said flange lower rearward portion by a pivot pin whereby said plate member may be rocked between forward or bicycle unbraked condition and rearward or bicycle braked condition, and means for maintaining said flange rigid.

6. For use with a bicycle having a frame, front and rear wheels supported on said frame, a pedal crank assembly having a crankshaft and first and second pedal cranks projecting from opposite ends thereof, a drive sprocket carried on said crankshaft inwardly of said first pedal crank, a driven sprocket engaged upon said rear wheel, a transmission chain interconnecting said drive and driven sprockets, and front and rear wheel caliper brakes, a brake control assembly comprising a disc cam mounted on said crankshaft inwardly of and adjacent said second pedal crank, said disc cam having at least one radially extending cam working surface, support means provided on said bicycle rearwardly of said disc cam, a vertically extending plate pivotally engaged in the lower end portion thereof upon said support means, brake control cables extending from said front and rear wheel brakes, means engaging the brake-remote ends of said brake control cables to said plate member in the upper end portion thereof, a latch arm extending substantially longitudinally of said bicycle and being pivotally engaged in its rearward end portion to the upper rearward end portion of said plate member, said latch arm having a cam follower for engagement with said cam working surface upon rearward rotation of said crankshaft whereby rearward movement is translated to said latch arm for causing rearward rocking of said plate member with commensurate rearward pulling upon said brake cables for effecting bicycle braking action, a brake release assembly provided adjacent said crankshaft remote from the portion thereof mounting said disc cam comprising said drive sprocket being mounted on said crankshaft to permit limited relative movement therebetween, cooperative components provided on said drive sprocket and said first pedal crank for interengagement upon termination of predetermined relative movement therebetween so that consequent rotation will be concurrent, said predetermined extent of relative movement between said drive sprocket and said first pedal crank substantially corresponding to the extent of rearward travel of said latch arm in moving between unbraked and braked condition.

7. For use with a bicycle, a brake control and release assembly as defined in claim 6 and further characterized by said cooperative components comprising an arcuated aperture provided on said drive sprocket radially inwardly of the periphery thereof, a finger projecting from said first pedal crank for reception within said aperture, the length of said aperture being greater than the cross-section of said finger thereby permitting relative movement of the latter within the former so that upon braking action said crank may be rotated through a predetermined arc simultaneously permitting disengagement of said cam working surface and said cam follower for freeing said latch arm from braked condition prior to resumption of rotation of said drive sprocket.

8. For use with a bicycle, a brake control and release assembly as defined in claims 6 or 7 and further characterized by said aperture having a leading edge and a trailing edge, and means urging said finger toward the trailing edge of said aperture so that upon back pedaling said finger will abut the trailing edge of said aperture thereby permitting forward rotation of said crank upon termination of braking action with stressing of said urging means.

9. For use with a bicycle having a frame, front and rear wheels supported on said frame, a pedal crank assembly having a crankshaft and first and second pedal cranks at opposite ends thereof, a drive sprocket carried on said crankshaft inwardly of said first pedal crank, a driven sprocket engaged upon said rear wheel, a transmission chain interconnecting said drive and driven sprockets, brake release means permitting of limited relative movement between said drive sprocket and said crankshaft after bicycle braking action whereby said crankshaft may turn prior to resumption of rotation of the rear wheel, said means comprising a sleeve-forming member carried on said crankshaft, said drive sprocket having a central opening for extension therethrough of said sleeve-forming member, circumferentially spaced-apart teeth provided on said sleeve-forming member, said drive sprocket having a circumferentially series of notches projecting inwardly from said central opening for receiving the teeth of said sleeve-forming member, said notches being formed on a greater arc than said teeth, and resilient means uging said teeth toward one of the related notches.

10. For use with a bicycle, brake release means as defined in claim 9 and further characterized by each of said drive sprocket notches having a leading edge and a trailing edge, said resilient means urging said teeth toward the rearward edge of the related notch whereby during forward travel of the bicycle the teeth will be gaged against the leading edges of said notches with said resilient means under stress.

11. For use with a bicycle, brake release means as defined in claim 10 and further characterized by said resilient means being a spring having one end engaged to said drive sprocket and the other end engaged to said sleeve.

12. For use with a bicycle having a frame, front and rear wheels supported on said frame, a pedal crank assembly having a crankshaft and first and second pedal cranks projecting from opposite ends thereof, a drive sprocket carried on said crankshaft inwardly of said first pedal crank, a driven sprocket engaged upon said rear wheel, a transmission chain interconnecting said drive and driven sprockets, and front and rear wheel caliper brakes, a brake control assembly comprising a disc cam mounted on said crankshaft upwardly of and adjacent said second pedal crank, said disc cam having at least one radially extending cam working surface, support means provided on said bicycle rearwardly of said disc cam, a vertically extending plate pivotally engaged in a lower end portion thereof upon said support means, brake control cables extending from said front and rear wheel brakes, means engaging the brake-remote ends of said brake control cables to said plate member in the upper end portion thereof, a latch arm extending substantially longitudinally of said bicycle and being pivotally engaged in its rearward end portion to the upper forward end portion of said plate member, said latch arm having a cam follower for engagement with said cam working surface upon rearward rotation of said crankshaft whereby rearward movement is translated to said latch arm for causing rearward rocking of said plate member with commensurate rearward pulling upon said brake cables for effecting bicycle braking action, brake release means permitting of limited relative movement between the drive sprocket and the crankshaft after bicycle braking action whereby said crankshaft may turn prior to resumption of rotation of the rear wheel, a sleeve-forming member carried on said crankshaft, said drive sprocket having a central opening for extension therethrough of said sleeve-forming member, circumferentially spaced-apart teeth provided on said sleeve-forming member, said drive sprocket having a circumferential series of notches projecting inwardly from said central opening for receiving the teeth on said sleeve-forming member, said notches being formed on a greater arc than said teeth, the relative movement between said drive sprocket and said first pedal crank substantially corresponding to the extent of rearward travel of said latch arm in moving between unbraked and braked condition, and resilient means urging said teeth toward one end of the related notches.

13. For use with a bicycle as defined in claim 12 wherein each of said drive sprocket notches has a leading edge and a trailing edge, said resilient means urging said teeth toward the rearward edge of the related notch whereby during forward travel of the bicycle the teeth will be engaged against the leading edges of said notches with said resilient means under stress.

14. For use with a bicycle as defined in claims 12 or 13 wherein said resilient means is a spring having one end engaged to said drive sprocket and the other end engaged to said sleeve.

* * * * *